(12) United States Patent
Nara et al.

(10) Patent No.: US 10,485,085 B2
(45) Date of Patent: Nov. 19, 2019

(54) EXTREME ULTRAVIOLET LIGHT SENSOR UNIT AND EXTREME ULTRAVIOLET LIGHT GENERATION DEVICE

(71) Applicant: GIGAPHOTON INC., Tochigi (JP)

(72) Inventors: Hisashi Nara, Oyama (JP); Hiroshi Someya, Oyama (JP); Takuya Ishii, Oyama (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 16/121,340

(22) Filed: Sep. 4, 2018

(65) Prior Publication Data

US 2019/0021159 A1 Jan. 17, 2019

Related U.S. Application Data

(63) Continuation of application No. PCT/JP2016/063260, filed on Apr. 27, 2016.

(51) Int. Cl.
*G21K 1/06* (2006.01)
*H05G 2/00* (2006.01)
*G02B 5/20* (2006.01)

(52) U.S. Cl.
CPC ............ *H05G 2/008* (2013.01); *G02B 5/208* (2013.01); *G21K 1/06* (2013.01)

(58) Field of Classification Search
CPC .......... G02B 5/208; H05G 2/008; H05G 2/00; G21K 1/06
See application file for complete search history.

(56) References Cited

U.S. PATENT DOCUMENTS 5,317,378 A * 5/1994 Mould ................... G01N 21/03
356/236
7,081,992 B2 * 7/2006 Tichenor ............ G03F 7/70175
359/359
(Continued)

FOREIGN PATENT DOCUMENTS

EP 3260902 A4 * 2/2018 ............. G02B 21/06
JP 2007264322 A * 10/2007
(Continued)

OTHER PUBLICATIONS

International Search Report issued in PCT/JP2016/063260; dated Jul. 27, 2016.
(Continued)

*Primary Examiner* — David P Porta
*Assistant Examiner* — Djura Malevic
(74) *Attorney, Agent, or Firm* — Studebaker & Brackett PC (57) ABSTRACT

An extreme ultraviolet light sensor unit according to one aspect of the present disclosure includes a mirror configured to reflect extreme ultraviolet light, a filter configured to transmit the extreme ultraviolet light reflected by the mirror, an optical sensor configured to detect the extreme ultraviolet light having passed through the filter, a purge gas supply unit disposed to supply purge gas to a space between the mirror and the filter, and a pipe part configured to allow plasma light including the extreme ultraviolet light entering from an opening to pass therethrough toward the mirror and allow the purge gas flowing to the space between the mirror and the filter to flow out of the opening.

20 Claims, 4 Drawing Sheets

(56) References Cited

U.S. PATENT DOCUMENTS

| | | | | |
|---|---|---|---|---|
| 7,312,459 B2* | 12/2007 | Amemiya | ............... | B82Y 10/00 250/372 |
| 7,453,077 B2* | 11/2008 | Bowering | ............... | H05G 2/003 250/396 R |
| 7,598,508 B2* | 10/2009 | Sogard | ................... | B82Y 10/00 250/493.1 |
| 7,622,727 B2* | 11/2009 | Shirai | .................... | B82Y 10/00 250/423 R |
| 7,732,793 B2* | 6/2010 | Ershov | .................... | B82Y 10/00 250/504 R |
| 7,960,701 B2* | 6/2011 | Bowering | ............... | B82Y 10/00 250/372 |
| 8,039,820 B2* | 10/2011 | Shirai | ................... | G03F 7/70033 250/492.1 |
| 8,314,398 B2* | 11/2012 | Bowering | ............... | B82Y 10/00 250/372 |
| 8,481,983 B2* | 7/2013 | Moriya | ............... | G03F 7/70033 250/493.1 |
| 8,648,536 B2* | 2/2014 | Kuwabara | ........... | G03F 7/70033 315/111.21 |
| 8,686,370 B2* | 4/2014 | Bowering | ............... | B82Y 10/00 250/365 |
| 9,000,402 B2* | 4/2015 | Kuwabara | .............. | H05G 2/008 250/493.1 |
| 9,172,058 B2* | 10/2015 | Lee | ..................... | H01L 27/3211 |
| 9,448,343 B2* | 9/2016 | Kvamme | ............. | G02B 5/0891 |
| 9,625,695 B2* | 4/2017 | Sun | ........................ | G02B 21/025 |
| 9,661,730 B2* | 5/2017 | Ueda | ..................... | H05G 2/008 |
| 10,009,991 B2* | 6/2018 | Nishisaka | .............. | H05G 2/006 |
| 10,028,365 B2* | 7/2018 | Ishihara | ................ | G03F 7/2004 |
| 10,172,224 B2* | 1/2019 | Yabu | .................... | G03F 7/70033 |
| 10,225,918 B2* | 3/2019 | Nishimura | ............. | H05G 2/008 |
| 2002/0164810 A1* | 11/2002 | Dukor | ............. | G01N 33/57415 436/64 |
| 2003/0058429 A1* | 3/2003 | Schriever | ............... | B82Y 10/00 355/133 |
| 2004/0145804 A1* | 7/2004 | Engel | ........................ | G01B 9/04 359/368 |
| 2005/0115333 A1* | 6/2005 | Fujimoto | .................. | G01F 1/00 73/861 |
| 2005/0205810 A1* | 9/2005 | Akins | ..................... | B82Y 10/00 250/504 R |
| 2006/0243927 A1* | 11/2006 | Tran | .................... | G03F 7/70033 250/504 R |
| 2007/0012889 A1* | 1/2007 | Sogard | ................... | B82Y 10/00 250/504 R |
| 2008/0074655 A1* | 3/2008 | Wilhelmus Van Herpen | ............. | G03F 7/70558 356/237.2 |
| 2008/0179548 A1* | 7/2008 | Bykanov | ................ | B82Y 10/00 250/504 R |
| 2009/0250641 A1* | 10/2009 | Moriya | ............... | G03F 7/70033 250/504 R |
| 2009/0314967 A1* | 12/2009 | Moriya | ............... | G03F 7/70191 250/504 R |
| 2010/0200776 A1* | 8/2010 | Yabu | ...................... | H05G 2/003 250/504 R |
| 2010/0288937 A1* | 11/2010 | Watanabe | ........... | G03F 7/70033 250/372 |
| 2011/0226745 A1* | 9/2011 | Nagai | ................. | G03F 7/70033 219/121.62 |
| 2012/0223257 A1* | 9/2012 | Nagai | ................. | G03F 7/70025 250/504 R |
| 2012/0241650 A1* | 9/2012 | Yabu | ...................... | H05G 2/003 250/504 R |
| 2012/0305809 A1* | 12/2012 | Moriya | .................. | H05G 2/003 250/504 R |
| 2013/0001612 A1* | 1/2013 | Lee | ..................... | H01L 27/3211 257/98 |
| 2013/0126761 A1* | 5/2013 | Nagai | ................... | H05G 2/005 250/504 R |
| 2013/0161540 A1* | 6/2013 | Nagai | ................... | H05G 2/005 250/504 R |
| 2014/0216576 A1* | 8/2014 | Someya | ................. | H05G 2/008 137/560 |
| 2016/0128171 A1* | 5/2016 | Kuritsyn | ............. | G03F 7/70033 250/504 R |
| 2016/0165708 A1* | 6/2016 | Nishisaka | .............. | H05G 2/008 250/504 R |
| 2017/0064799 A1* | 3/2017 | Yabu | ................... | G03F 7/70033 |
| 2018/0024344 A1* | 1/2018 | Ueda | ..................... | G02B 21/06 359/363 |
| 2018/0352641 A1* | 12/2018 | Nishimura | ............. | H05G 2/008 |

FOREIGN PATENT DOCUMENTS

| | | |
|---|---|---|
| JP | 2011-135028 A | 7/2011 |
| JP | 2011-228742 A | 11/2011 |
| JP | 2013-012465 A | 1/2013 |
| JP | 2014-154229 A | 8/2014 |
| WO | 2015/040674 A1 | 3/2015 |
| WO | 2016/013550 A1 | 1/2016 |

OTHER PUBLICATIONS

The International Preliminary Report on Patentability and Translation of Written Opinion of the International Searching Authority; PCT/JP2016/063260; dated Oct. 30, 2018.

* cited by examiner

EXTREME ULTRAVIOLET LIGHT SENSOR UNIT AND EXTREME ULTRAVIOLET LIGHT GENERATION DEVICE

CROSS-REFERENCE TO RELATED APPLICATIONS

The present application is a continuation application of International Application No. PCT/JP2016/063260 filed on Apr. 27, 2016. The content of the application is incorporated herein by reference in its entirety.

BACKGROUND

1. Technical Field

The present disclosure relates to an extreme ultraviolet light sensor unit and an extreme ultraviolet light generation device.

2. Related Art

In recent years, along with microfabrication in the semiconductor manufacturing process, fine transfer patterns in photolithography of the semiconductor manufacturing process have been developed rapidly. In the next generation, microfabrication of 20 nm or smaller will be required. Accordingly, it is expected to develop an exposure device in which a device for generating extreme ultraviolet (EUV) light having a wavelength of about 13 nm and a reflection reduction projection optical system are combined.

As EUV light generation devices, three types of devices have been proposed, namely, a laser produced plasma (LPP) type device that uses plasma generated when a target material is irradiated with laser light, a discharge produced plasma (DPP) type device that uses plasma generated by discharging, and a synchrotron radiation (SR) type device that uses orbital radiation light.

CITATION LIST

Patent Literature

Patent Literature 1: U.S. Pat. No. 7,732,793
Patent Literature 2: Japanese Patent Application Laid-Open No. 2014-154229
Patent Literature 3: Japanese Patent Application Laid-Open No. 2011-135028

SUMMARY

An extreme ultraviolet light sensor unit according to one aspect of the present disclosure may include a mirror, a filter, an optical sensor, a purge gas supply unit, and a pipe part. The mirror may be configured to reflect extreme ultraviolet light. The filter may be configured to transmit the extreme ultraviolet light reflected by the mirror. The optical sensor may be configured to detect the extreme ultraviolet light having passed through the filter. The purge gas supply unit may be disposed to supply purge gas to a space between the mirror and the filter. The pipe part may be configured to allow plasma light and the purge gas to pass therethrough. The plasma light includes the extreme ultraviolet light to be made incident on the mirror, and the purge gas is supplied from the purge gas supply unit. The pipe part may have an opening serving as a light entry port of the plasma light. The pipe part may allow the plasma light entering from the opening to pass therethrough toward the mirror, and allow the purge gas flowing to the space between the mirror and the filter to flow out of the opening.

BRIEF DESCRIPTION OF THE DRAWINGS

Some embodiments of the present disclosure will be described below as just examples with reference to the accompanying drawings.

EMBODIMENTS

Contents
1. Overall description of extreme ultraviolet light generation system
  1.1 Configuration
  1.2 Operation
2. Terms
3. Problem
4. First Embodiment
  4.1 Configuration
  4.2 Operation
  4.3 Effect
5. Second Embodiment
  5.1 Configuration
  5.2 Operation
  5.3 Effect Hereinafter, embodiments of the present disclosure will be described in detail with reference to the drawings.

The embodiments described below illustrate some examples of the present disclosure, and do not limit the contents of the present disclosure. All of the configurations and the operations described in the embodiments are not always indispensable as configurations and operations of the present disclosure. The same constituent elements are denoted by the same reference signs, and redundant description is omitted.

Figure 1:
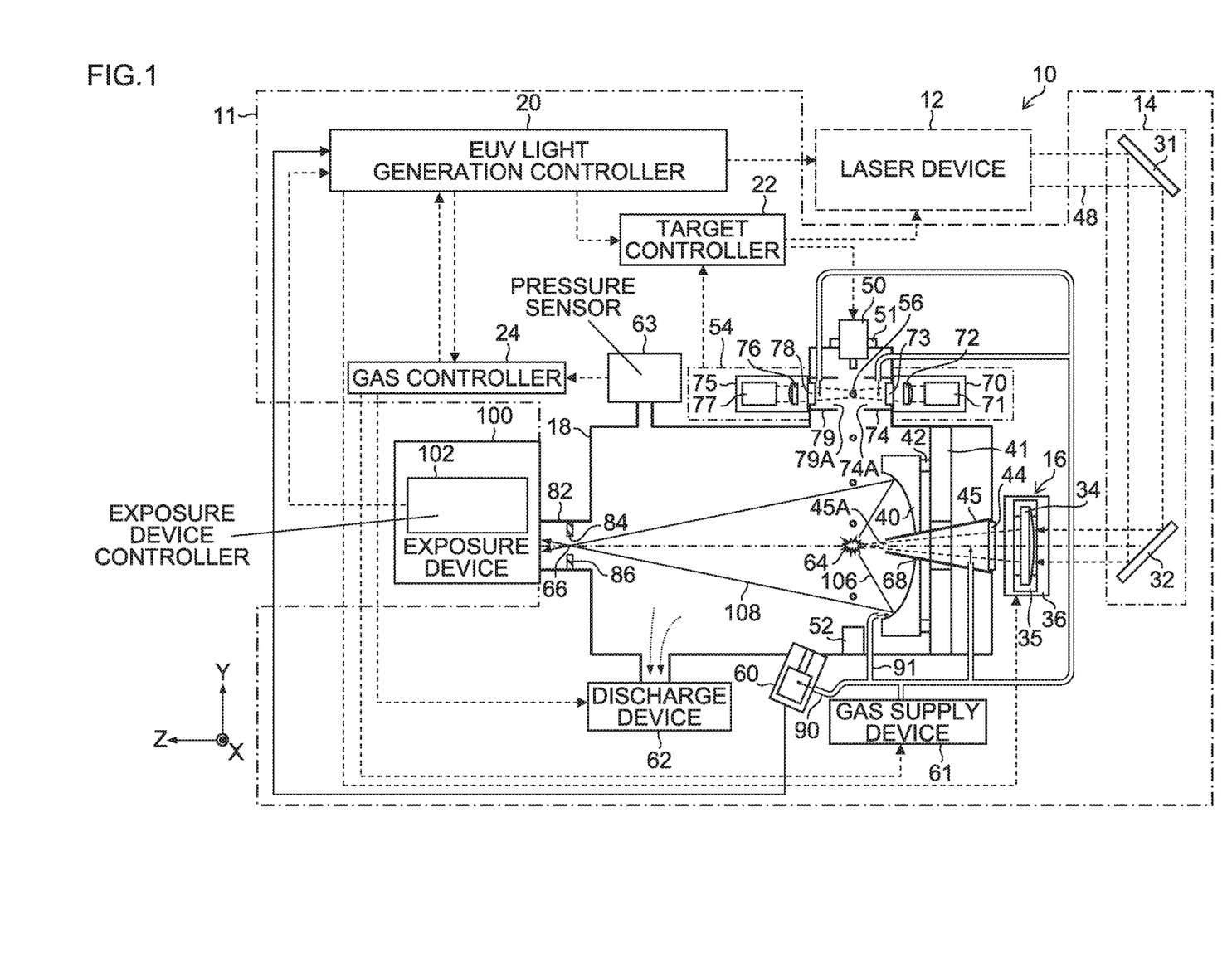
FIG. 1 is a diagram schematically illustrating a configuration of an exemplary LPP type EUV light generation system.

1. Overall Description of Extreme Ultraviolet Light Generation System 1.1 Configuration FIG. 1 schematically illustrates a configuration of an exemplary LPP type EUV light generation system 10. An EUV light generation device 11 may be used together with at least one laser device 12. In the present disclosure, a system including the EUV light generation device 11 and the laser device 12 is referred to as the EUV light generation system 10.

As illustrated in FIG. 1 and described in detail below, the EUV light generation device 11 includes a laser light transmission device 14, a laser light condensing optical system 16, a chamber 18, an EUV light generation controller 20, a target controller 22, and a gas controller 24.

The laser device 12 may be a master oscillator power amplifier (MOPA) system. The laser device 12 may include a master oscillator not illustrated, an optical isolator not illustrated, and a plurality of $CO_2$ laser amplifiers not illustrated. The master oscillator may output laser light having a wavelength in an amplification region of the $CO_2$ laser amplifier, with a given repetition frequency. The wavelength of the laser light, output from the master oscillator, is 10.59 μm, for example, and the given repetition frequency is 100 kHz, for example. As the master oscillator, a solid-state laser is adoptable.

The laser light transmission device 14 includes an optical component for defining a travel direction of the laser light, and an actuator for regulating the position, posture, and the like of the optical component. As the optical component for defining the travel direction of the laser light, the laser light transmission device 14 illustrated in FIG. 1 includes a first high reflective mirror 31 and a second high reflective mirror 32.

The laser light condensing optical system 16 includes a condensing lens 34, a condensing lens holder 35, and a triaxial stage 36. The condensing lens 34 is held by the condensing lens holder 35. The condensing lens holder 35 is fixed to the triaxial stage 36. The triaxial stage 36 can move the condensing lens holder 35 in triaxial directions such as an X axis, a Y axis, and a Z axis orthogonal to one another. In FIG. 1, a direction of deriving the EUV light from the chamber 18 toward the exposure device 100 is assumed to be the Z axis. In FIG. 1, a direction orthogonal to the sheet surface is assumed to be the X axis, and a vertical direction parallel to the sheet surface is assumed to be the Y axis. The laser light condensing optical system 16 condenses the laser light, transmitted by the laser light transmission device 14, to the plasma generation region 64 in the chamber 18.

The chamber 18 is a sealable container. The chamber 18 may be formed in a hollow spherical shape or a hollow cylindrical shape, for example. The chamber 18 includes an EUV light condensing mirror 40, a plate 41, an EUV light condensing mirror holder 42, a first window 44, and a first cover 45. The chamber 18 also includes a target feeding unit 50, a biaxial stage 51, a droplet receiver 52, a droplet detection device 54, an EUV light sensor unit 60, a gas supply device 61, a discharge device 62, and a pressure sensor 63.

A wall of the chamber 18 has at least one through hole. The through hole is closed with a first window 44. Pulse laser light 48 output from the laser device 12 passes through the first window 44 via the condensing lens 34.

The EUV light condensing mirror 40 includes a spheroidal reflection surface, and has a first focus and a second focus, for example. On the surface of the EUV light condensing mirror 40, a multilayer reflection film in which molybdenum and silicon are alternately layered is formed, for example. The EUV light condensing mirror 40 is disposed such that the first focus thereof is positioned in the plasma generation region 64 and the second focus thereof is positioned at an intermediate focusing point (IF) 66, for example. A center portion of the EUV light condensing mirror 40 is provided with a through hole 68 through which pulse laser light 48 passes.

The plate 41 and the EUV light condensing mirror holder 42 are members that hold the EUV light condensing mirror 40. The plate 41 is fixed to the chamber 18. The EUV light condensing mirror 40 is held by the plate 41 via the EUV light condensing mirror holder 42.

The first cover 45 is a shroud that covers an optical path through which the pulse laser light 48 is guided from the first window 44 to the plasma generation region 64 through the through hole 68. The first cover 45 is formed to be in a truncated conical cylindrical shape tapered from the first window 44 toward the plasma generation region 64.

The target feeding unit 50 feeds a target substance into the chamber 18, and is mounted so as to penetrate a wall of the chamber 18, for example. The target feeding unit 50 is mounted on the wall of the chamber 18 via the biaxial stage 51. The biaxial stage 51 is an XZ axial stage that can move the target feeding unit 50 in the X axial direction and the Z axial direction respectively. The position of the target feeding unit 50 can be adjusted within an XZ plane by the biaxial stage 51.

The material of the target substance may include, but not limited to, tin, terbium, gadolinium, lithium, xenon, or a combination of any two or more of them. The target feeding unit 50 outputs a droplet 56 made of the target substance, toward the plasma generation region 64 in the chamber 18.

The target controller 22 is connected with each of the EUV light generation controller 20, the laser device 12, the target feeding unit 50, and the droplet detection device 54. The target controller 22 controls operation of the target feeding unit 50 in accordance with an instruction from the EUV light generation controller 20. The target controller 22 also controls an output timing of the pulse laser light 48 of the laser device 12, based on a detection signal from the droplet detection device 54.

The droplet detection device 54 detects any or a plurality of the presence, the trajectory, the position, and the velocity of the droplet 56. The droplet detection device 54 is disposed so as to be able to detect a change of the trajectory in the X direction. The droplet detection device 54 includes a light source unit 70 and a light receiving unit 75.

The light source unit 70 includes a light source 71, an illumination optical system 72, a second window 73, and a second cover 74. The light source 71 may be a lamp, a semiconductor laser, or the like. The illumination optical system 72 may be a condensing lens that illuminates a droplet trajectory with the light output from the light source 71.

The light receiving unit 75 includes a transfer optical system 76, a first optical sensor 77, a third window 78, and a third cover 79. The transfer optical system 76 may include a lens that transfers an image of the illuminated droplet 56 onto an element of the first optical sensor 77. The first optical sensor 77 may include a two-dimensional image sensor such as a charge-coupled device (CCD).

The chamber 18 includes another droplet detection device not illustrated, and detects a deviation of the trajectory in the Z direction of the droplet 56 by the other droplet detection device not illustrated.

The droplet receiver 52 is disposed on an extended line in a travel direction of the droplet 56 output from the target feeding unit 50 into the chamber 18. In FIG. 1, the dropping direction of the droplet 56 is a direction parallel to the Y axis, and the droplet receiver 52 is disposed at a position opposed to the target feeding unit 50 in the Y direction.

The EUV light generation device 11 also includes a connecting section 82 that allows the inside of the chamber 18 and the inside of the exposure device 100 to communicate with each other. The inside of the connecting section 82 is provided with a wall 86 having an aperture 84. The wall 86 may be disposed such that the aperture 84 is positioned at the second focus position of the EUV light condensing mirror 40.

The exposure device 100 includes an exposure device controller 102 which is connected with the EUV light generation controller 20.

The EUV light sensor unit 60 detects EUV light generated in the chamber 18. The EUV light sensor unit 60 is connected with the EUV light generation controller 20. A plurality of EUV light sensor units 60 may be provided so that the EUV light sensor units 60 can observe plasma from a plurality of different positions. While one EUV light sensor unit 60 is illustrated in FIG. 1, it is preferable to have a plurality of EUV light sensor units 60 at a plurality of positions around the chamber 18.

The gas supply device 61 is connected with spaces in the first cover 45, the second cover 74, and the third cover 79, and the EUV light sensor unit 60, via a pipe 90. The gas supply device 61 is also connected with a pipe 91 allowing the gas to flow therethrough to the surface of the EUV light condensing mirror 40. The gas supply device 61 supplies gas to the pipes 90 and 91. The gas supply device 61 may be a hydrogen gas supply device that supplies hydrogen gas, for example.

Hydrogen gas is an example of purge gas. The purge gas is not limited to hydrogen gas, and may be a gas containing hydrogen. It is preferable that the purge gas be a gas containing a component that can react with the material of the target substance and generate a gas that is a compound. The type of purge gas is selected according to the material of the target substance.

The gas controller 24 is connected with each of the EUV light generation controller 20, the gas supply device 61, the discharge device 62, and the pressure sensor 63. The discharge device 62 discharges the air in the chamber 18 to the outside of the chamber 18, in accordance with an instruction from the gas controller 24. The pressure sensor 63 detects the pressure in the chamber 18. A detection signal of the pressure sensor 63 is transmitted to the gas controller 24. The gas controller 24 controls operation of the gas supply device 61 and the discharge device 62, in accordance with an instruction from the EUV light generation controller 20.

The EUV light generation controller 20 integrally controls the entire EUV light generation system 10. The EUV light generation controller 20 processes a detection result of the EUV light sensor unit 60. The EUV light generation controller 20 may control the output timing of the droplet 56, the output direction of the droplet 56, and the like, for example, based on the detection result of the droplet detection device 54. The EUV light generation controller 20 may also control the oscillation timing of the laser device 12, the travel direction of the pulse laser light 48, the condensing position of the pulse laser light 48, and the like, for example. The aforementioned various types of control are mere examples. Other types of control may be added as required, or part of the control functions may be omitted.

In the present disclosure, controllers such as the EUV light generation controller 20, the target controller 22, the gas controller 24, and the exposure device controller 102 can be realized by a combination of hardware and software of one or a plurality of computers. Software has the same meaning as a program. It is also possible to realize functions of a plurality of controllers by one controller. Further, in the present disclosure, the EUV light generation controller 20, the target controller 22, the gas controller 24, and the exposure device controller 102, and the like may be connected with one another over a communication network such as a local area network or the Internet. In a distributed computing environment, a program unit may be stored in memory storage devices of both local and remote.

Figure 2:
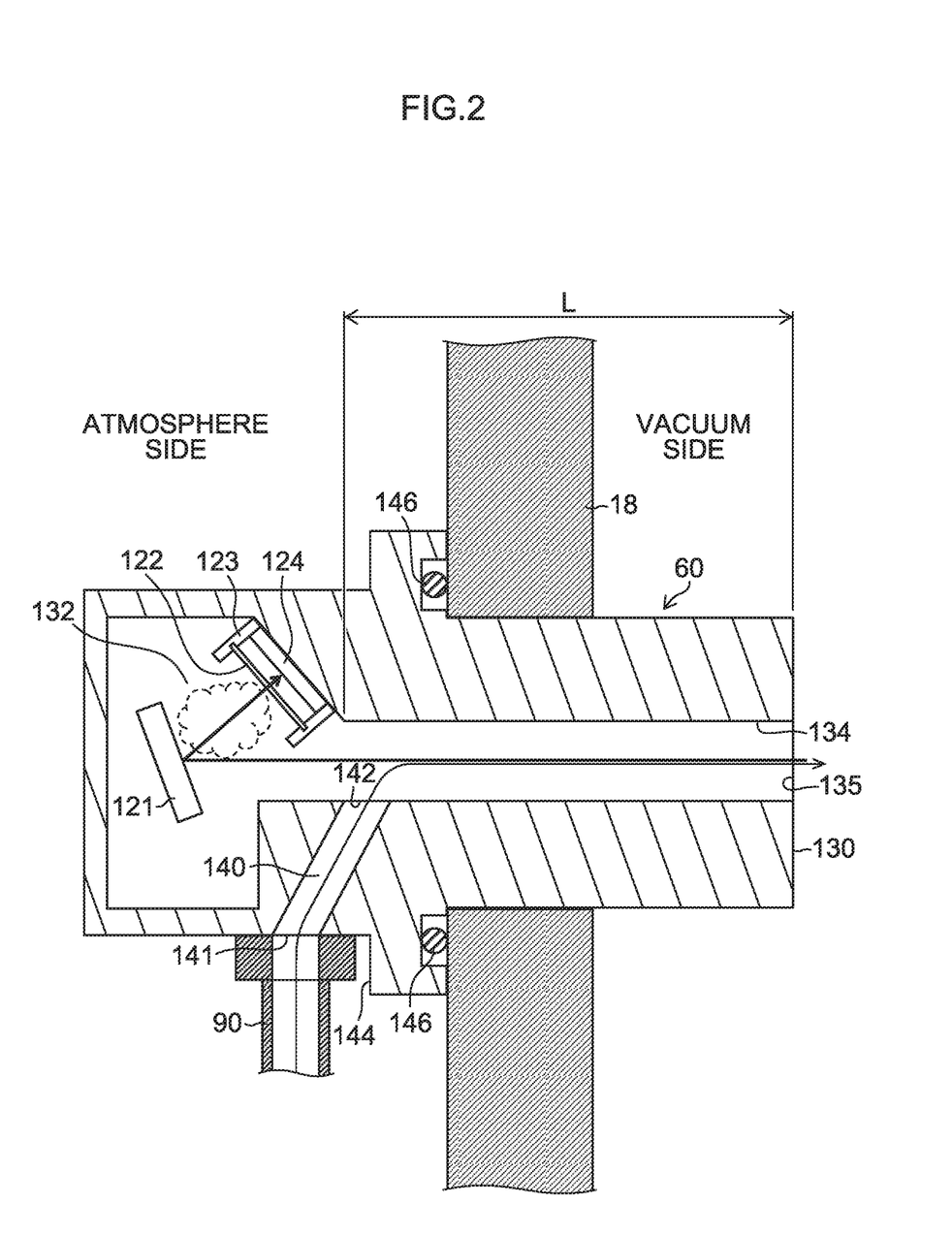
FIG. 2 is a cross-sectional view illustrating an exemplary configuration of an EUV light sensor unit.

FIG. 2 is a schematic configuration diagram illustrating an example of the EUV light sensor unit 60. The EUV light sensor unit 60 is installed penetrating the wall of the chamber 18 in which EUV light is generated. In FIG. 2, the right side of the wall of the chamber 18 is the inner side of the chamber 18, that is, a vacuum side, and the left side of the wall of the chamber 18 is an atmosphere side.

The EUV light sensor unit 60 includes an EUV light reflecting mirror 121, a filter 122, and a second optical sensor 124. The EUV light reflecting mirror 121 is a mirror including a multilayer reflecting film that selectively reflects light including EUV light, of the light radiated from plasma. The EUV light reflecting mirror 121 may be a mirror including an Mo/Si multilayer film in which molybdenum (Mo) and silicon (Si) are alternately layered, for example.

The filter 122 is a filter that selectively transmits light having a wavelength of the EUV light, of the light reflected by the EUV light reflecting mirror 121. The wavelength of the EUV light passing through the filter 122 is 13.5 nm, for example. The filter 122 is a metallic thin film filter having a film thickness of 300 nm to 600 nm, for example. As an example, a metallic thin film filter made of zirconium (Zr) may be used. The filter 122 is disposed to cover the light receiving surface of the second optical sensor 124. By the combination of the reflection characteristics of the EUV light reflecting mirror 121 and the transmission characteristics of the filter 122, it is possible to make the EUV light having a desired wavelength incident on the second optical sensor 124.

The second optical sensor 124, such as a photodiode, detects energy of the incident light. The second optical sensor 124 outputs an electric signal corresponding to the light receiving amount. A signal output from the second optical sensor 124 is transmitted to the EUV light generation controller 20.

The EUV light sensor unit 60 includes a hollow casing 130 that accommodates the EUV light reflecting mirror 121, the filter 122, and the second optical sensor 124. The casing 130 includes an optical component accommodating part 132, a cylindrical part 134, and a gas supply unit 140.

The optical component accommodating part 132 is a space in which the EUV light reflecting mirror 121, the filter 122, and the second optical sensor 124 are accommodated. The EUV light reflecting mirror 121 is held by a mirror holding member not illustrated. The second optical sensor 124 is mounted on a part of a wall surface of the casing 130 defining the optical component accommodating part 132. The filter 122 is held by a filter holding member 123, and is disposed on the front surface of the second optical sensor 124.

The cylindrical part 134 has an opening 135 serving as a light entry port of the plasma light including EUV light. A part of the cylindrical part 134 including the opening 135 is disposed inside the chamber 18. The plasma light entering from the opening 135 passes through the cylindrical part 134 and is made incident on the EUV light reflecting mirror 121.

The gas introduction port 141 of the gas supply unit 140 is connected with the pipe 90 for supplying gas. The gas introduced into the casing 130 through the pipe 90 is ejected from a gas outflow port 142 of the gas supply unit 140, and flows into the chamber 18 from the opening 135 through the cylindrical part 134.

The casing 130 has a flange portion 144. The EUV light sensor unit 60 is inserted from the atmosphere side into a through hole provided in the wall of the chamber 18, and is fixed to the chamber 18 via the flange portion 144. This means that the flange portion 144 of the casing 130 is disposed outside the chamber 18, and is fixed to the wall of the chamber 18 via a gasket 146.

In FIG. 2, an arrow that starts from the pipe 90 through the gas supply unit 140 and the cylindrical part 134 and goes out of the opening 135 shows a gas flow. Further, an arrow that starts from the opening 135 through the cylindrical part 134, is folded back by the EUV light reflecting mirror 121, and runs toward the filter 122 and the second optical sensor 124 shows an optical path of the plasma light or the EUV light.

1.2 Operation

Operation of the exemplary LPP type EUV light generation system 10 will be described with reference to FIGS. 1 and 2. When the EUV light generation system 10 outputs EUV light, an EUV light output instruction is transmitted from the exposure device controller 102 of the exposure device 100 to the EUV light generation controller 20.

The EUV light generation controller 20 transmits a control signal to the gas controller 24. The gas controller 24 controls the gas supply device 61 and the discharge device 62 such that the pressure in the chamber 18 falls within a given range, based on a detection value of the pressure sensor 63.

The given range of the pressure in the chamber 18 includes values between several Pa to several hundreds Pa, for example. Hydrogen gas transmitted from the gas supply device 61 is supplied into the first cover 45, the second cover 74, and the third cover 79, and is also supplied into the EUV light sensor unit 60, through the pipe 90. Further, the hydrogen gas transmitted from the gas supply device 61 is supplied to the reflection surface of the EUV light condensing mirror 40 through the pipe 91.

The hydrogen gas supplied into the first cover 45 is ejected from an opening 45A of the first cover 45. The hydrogen gas supplied into the second cover 74 is ejected from an opening 74A of the second cover 74. The hydrogen gas supplied into the third cover 79 is ejected from an opening 79A of the third cover 79. The hydrogen gas supplied into the EUV light sensor unit 60 is ejected from an opening 135 of the EUV light sensor unit 60.

The gas controller 24 transmits a signal to the EUV light generation controller 20 when the internal pressure of the chamber 18 becomes a pressure within a given range. After the EUV light generation controller 20 receives the signal transmitted from the gas controller 24, the EUV light generation controller 20 transmits a droplet output instruction signal to instruct the target controller 22 to output a droplet.

When the target controller 22 receives the droplet output instruction signal, the target controller 22 transmits a droplet output signal to the target feeding unit 50 to allow the target feeding unit 50 to output the droplet 56. The droplet 56 may be a droplet of molten tin (Sn).

The trajectory of the droplet 56 output from the target feeding unit 50 is detected by the droplet detection device 54. A detection signal detected by the droplet detection device 54 is transmitted to the target controller 22.

The target controller 22 may transmit a feedback signal to the biaxial stage 51 such that the trajectory of the droplet 56 becomes a desired trajectory, based on the detection signal obtained from the droplet detection device 54.

When the trajectory of the droplet 56 is stabilized, the target controller 22 outputs a trigger signal delayed by a given time to the laser device 12, in synchronization with an output signal of the droplet 56. The delay time is set such that the laser light is radiated to the droplet 56 when the droplet 56 reaches the plasma generation region 64.

The laser device 12 outputs laser light in synchronization with the trigger signal. The power of the laser light output from the laser device 12 reaches several kW to several tens kW. The laser light output from the laser device 12 is made incident on the condensing lens 34 of the laser light condensing optical system 16 via the laser light transmission device 14. The laser light made incident on the condensing lens 34 is condensed by the condensing lens 34, and passes through the first window 44 and enters the chamber 18. The laser light entering the chamber 18 via the condensing lens 34 is radiated to the droplet 56 that reached the plasma generation region 64.

The droplet 56 is irradiated with at least one pulse included in the pulse laser light 48. The droplet 56 irradiated with the pulse laser light is made into plasma, and radiation light 106 is emitted from the plasma. The EUV light 108 included in the radiation light 106 is selectively reflected by the EUV light condensing mirror 40. The EUV light 108 reflected by the EUV light condensing mirror 40 is condensed at the intermediate focusing point 66 and is output to the exposure device 100. One droplet 56 may be irradiated with a plurality of pulses included in the pulse laser light 48.

The droplet receiver 52 recovers the droplet 56 having not been irradiated with the laser light and having passed through the plasma generation region 64, or part of the droplet 56 not dispersed even with irradiation of the laser light.

The EUV light sensor unit 60 observes the EUV light included in the radiation light 106 radiated from the plasma. The energy of the EUV light generated in the chamber 18 may be measured by measuring the energy of the EUV light radiated from the plasma, based on a signal obtained from the EUV light sensor unit 60.

Part of the radiation light 106 enters the EUV light sensor unit 60 from the opening 135, and passes through the cylindrical part 134 and is made incident on the EUV light reflecting mirror 121. The EUV light reflecting mirror 121 reflects EUV light included in the radiation light 106 toward the filter 122. EUV light having a specific wavelength, of the light made incident on the filter 122, passes through the filter 122. The EUV light having passed through the filter 122 is received by the second optical sensor 124. The energy of the EUV light can be detected based on a signal output from the second optical sensor 124.

In the case where a plurality of EUV light sensor units 60 are disposed, the position of the plasma can be calculated from the detected position and detected energy of each of the EUV light sensor units 60.

Along with generation of the plasma, Sn debris may be generated and dispersed in the chamber 18. In that case, Sn debris means Sn particles. The dispersed Sn debris may reach the opening 45A of the first cover 45, the opening 74A of the second cover 74, the opening 79A of the third cover 79, and the opening 135 of the EUV light sensor unit 60.

From the opening 45A of the first cover 45, the opening 74A of the second cover 74, the opening 79A of the third cover 79, and the opening 135 of the EUV light sensor unit 60, hydrogen gas is ejected. As such, it is possible to suppress reaching of the Sn debris to the first window 44, the second window 73, the third window 78, and the EUV light reflecting mirror 121 in the EUV light sensor unit 60.

When the gas supplied to the surface of the EUV light condensing mirror 40 includes hydrogen, the Sn debris deposited on the EUV light condensing mirror 40 reacts with the hydrogen to generate stannane gas ($SnH_4$). The stannane gas is discharged to the outside of the chamber 18 by the discharge device 62.

Similarly, when the gas including hydrogen is supplied to the surroundings of the first window 44, the second window 73, and the third window 78, deposition of Sn debris on the first window 44, the second window 73, and the third window 78 can be suppressed.

2. Terms

A "target" is an object to be irradiated with laser light introduced to the chamber. The target irradiated with laser light is made into plasma and emits EUV light. A droplet made of a liquid target substance is a form of a target.

"Plasma light" is radiation light emitted from a target made into plasma. The radiation light includes EUV light.

The expression "EUV light" is an abbreviation of "extreme ultraviolet light".

The term "optical component" has the same meaning as an optical element or an optical member.

3. Problem

At the EUV light sensor unit 60 illustrated in FIG. 2, gas is supplies into the casing 130 and ejected from the opening 135 via the cylindrical part 134, whereby it is possible to suppress reaching of the Sn debris to the EUV light reflecting mirror 121.

As the inner diameter of the cylindrical part 134 is smaller and a length L of the cylindrical part 134 is longer, the possibility that the hydrogen and Sn react with each other becomes higher when Sn debris enters. Thus, it is possible to make the Sn debris into stannane gas more reliably. Meanwhile, there are problems as described below.

[Problem 1] When the design freedom of the EUV light sensor unit 60 is restricted, Sn debris passes through the cylindrical part 134 and is deposited on the EUV light reflecting mirror 121. For example, it may be difficult to sufficiently secure the length L of the cylindrical part 134 structurally. Due to the layout of other sensors or pipes mounted on the chamber 18, there is a case where the length L of the cylindrical part 134 of the EUV light sensor unit 60 cannot be secured sufficiently. If the length L of the cylindrical part 134 cannot be secured sufficiently, Sn debris may be deposited on the EUV light reflecting mirror 121. When Sn debris is deposited on the EUV light reflecting mirror 121, measurement by the second optical sensor 124 cannot be performed accurately.

Further, there is also a case where the flow rate of the gas supplied into the EUV light sensor unit 60 cannot be secured sufficiently. As the gas supplied into the EUV light sensor unit 60 absorbs EUV light, the internal pressure of the chamber 18 must be kept at a pressure within a given range. Meanwhile, the discharge capacity of the discharge device 62 also has a limit due to a restriction on the footprint or the like. As such, when attempting to secure the gas supply flow rate to the first cover 45, the second cover 74, and the third cover 79 and the gas supply flow rate to the EUV light condensing mirror 40, there is a case where the gas flow rate supplied to the inside of the EUV light sensor unit 60 cannot be secured sufficiently. When the gas flow rate cannot be secured sufficiently, Sn debris may be deposited on the EUV light reflecting mirror 121.

[Problem 2] The EUV light sensor unit 60 has a closed structure except for the gas introduction port 141 and the opening 135. Accordingly, Sn debris deposited on the EUV light reflecting mirror 121 reacts with hydrogen gas retained in the EUV light sensor unit 60, and is changed to stannane gas. However, when the stannane gas is retained near the EUV light reflecting mirror 121, supplying of hydrogen gas to the retention space is suppressed. Then, reaction between the Sn debris, deposited one after another, and the hydrogen gas is prevented, whereby deposition of the Sn debris on the EUV light reflecting mirror 121 progresses. Due to deposition of the Sn debris, the reflectance of the EUV light reflecting mirror drops, which interferes with measurement of EUV light. FIG. 2 schematically illustrates a state where stannane gas is retained between the EUV light reflecting mirror 121 and the filter 122.

[Problem 3] At the time of performing maintenance of the EUV light sensor unit 60, it is necessary to detach the pipe 90 for hydrogen gas. Leakage of hydrogen gas involves a risk that the device stops due to an alarm. Accordingly, each time the pipe 90 is reconnected, it is necessary to carefully perform a leakage check. The chamber 18 may be provided with a plurality of EUV light sensor units 60. Accordingly, maintenance of the EUV light sensor unit 60 is a time-consuming work.

4. First Embodiment
4.1 Configuration

Figure 3:
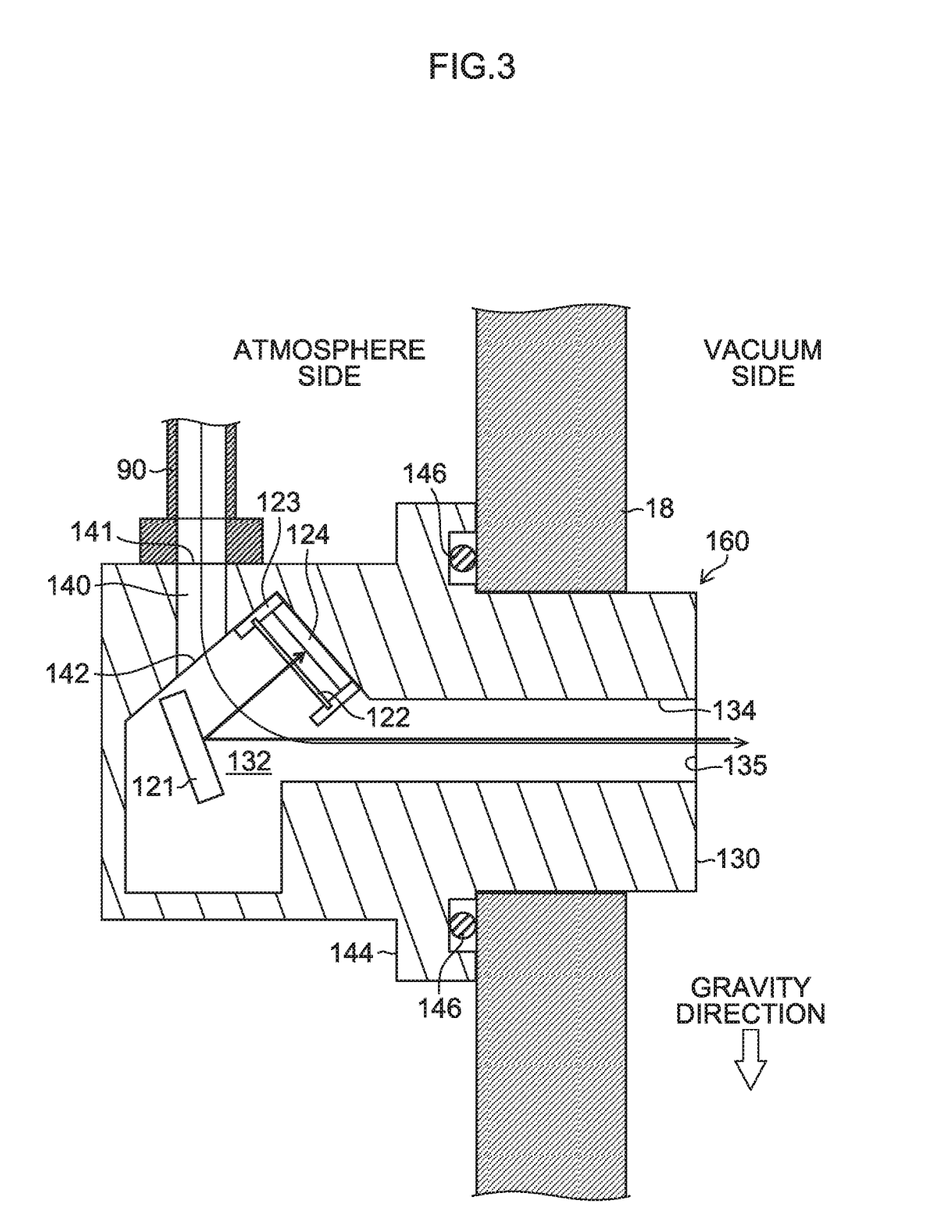
FIG. 3 is a cross-sectional view illustrating a configuration of an EUV light sensor unit according to a first embodiment.

FIG. 3 is a cross-sectional view illustrating a configuration of an EUV light sensor unit according to a first embodiment. Regarding the first embodiment illustrated in FIG. 3, a difference from the configuration described in FIG. 2 will be described. An EUV light sensor unit 160 illustrated in FIG. 3 can be used instead of the EUV light sensor unit 60 described in FIG. 2.

The EUV light sensor unit 160 according to the first embodiment includes a gas supply unit 140 disposed to supply purge gas to a space between the EUV light reflecting mirror 121 and the filter 122. The gas supply unit 140 has a gas outflow port 142 from which purge gas is ejected toward the space between the EUV light reflecting mirror 121 and the filter 122. The gas outflow port 142 is open toward the EUV light reflecting mirror 121. The gas flowing out of the gas outflow port 142 is sprayed to the EUV light reflecting mirror 121. This means that the gas outflow port 142 is provided at a position that the purge gas is directly sprayed to the EUV light reflecting mirror 121. The gas outflow port 142 is provided at a position not facing the filter 122 so as to prevent the gas from being sprayed directly to the filter 122.

In the example of FIG. 3, a downward direction in the drawing is a gravity direction. The EUV light reflecting mirror 121 is disposed in a state where the reflection surface is tilted so as to reflect the incident light obliquely upward. Further, each of the filter 122 and the second optical sensor 124 is provided in a posture in which the light incident surface thereof faces the EUV light reflecting mirror 121 provided at an oblique downside.

The cylindrical part 134 includes a pipe part that allows plasma light that is to be made incident on the EUV light reflecting mirror 121 and the purge gas supplied from the gas supply unit 140, to pass therethrough. The cylindrical part 134 functions as an optical path pipe that allows plasma light entering from the opening 135 to pass therethrough toward the EUV light reflecting mirror 121. Further, the cylindrical part 134 functions as a gas flow pipe that allows the purge gas flowing to the space between the EUV light reflecting mirror 121 and the filter 122 to pass therethrough toward the opening 135. The opening 135 functions as a light entry port for the plasma light and also a gas ejection port from which purge gas flows into the chamber 18.

4.2 Operation

At least during generation of EUV light, hydrogen gas is ejected from the gas outflow port 142 of the gas supply unit 140 in the EUV light sensor unit 60, and the hydrogen gas is sprayed to the EUV light reflecting mirror 121. The gas outflow port 142 is positioned above the EUV light reflecting mirror 121. Purge gas is ejected downward from the gas outflow port 142 toward the EUV light reflecting mirror 121. This means that the EUV light reflecting mirror 121 is disposed below the gas outflow port 142, and purge gas is supplied from the reflected light path side of the EUV light reflecting mirror 121 to the space between the EUV light reflecting mirror 121 and the filter 122.

An optical path through which the EUV light reflected by the EUV light reflecting mirror 121 travels toward the filter 122 is a reflected light path of the EUV light reflecting mirror 121. An optical path of plasma light from the opening 135, having passed through the cylindrical part 134 and made incident on the EUV light reflecting mirror 121, is an incident light path of the EUV light reflecting mirror 121. The incident light path of plasma light to the EUV light reflecting mirror 121 is referred to as a first optical path. The reflected light path of the EUV light from the EUV light reflecting mirror 121 to the filter 122 is referred to as a second optical path. The gas outflow port 142 of the gas supply unit 140 is provided at a position close to the second optical path among the first and second optical paths.

This means that the axis of the gas supply path of the gas supply unit 140 crosses the second optical path, and the gas ejected from the gas outflow port 142 first crosses the second optical path and then flows toward the first optical path. The gas supply unit 140 supplies purge gas from the second optical path, among the first and second optical paths, to the space between the EUV light reflecting mirror 121 and the filter 122.

The hydrogen gas ejected from the gas outflow port 142 flows between the EUV light reflecting mirror 121 and the filter 122, passes through the cylindrical part 134, and flows from the opening 135 into the chamber 18. The EUV light sensor unit 160 illustrated in FIG. 3 is in a form such that the axis of the gas supply path of the gas supply unit 140 is parallel to the gravity direction, in a state of being mounted on the chamber 18. However, the axis of the gas supply path of the gas supply unit 140 may not be parallel to the gravity direction. For example, the mounting posture when the EUV light sensor unit 160 illustrated in FIG. 3 is mounted on the chamber 18 is not limited to the example illustrated in FIG. 3. The EUV light sensor unit 160 may be used in an appropriate posture.

The EUV light reflecting mirror 121 corresponds to a form of a "mirror configured to reflect extreme ultraviolet light". The second optical sensor 124 corresponds to a form of an "optical sensor configured to detect extreme ultraviolet light having passed through a filter". The gas supply unit 140 illustrated in FIG. 3 corresponds to a form of a "purge gas supply unit". The cylindrical part 134 corresponds to a form of a "pipe part".

4.3 Effect

According to the first embodiment, by allowing gas to be ejected from the opening 135 via the cylindrical part 134, it is possible to suppress reaching of Sn debris to the EUV light reflecting mirror 121. Further, Sn debris, having entered from the opening 135, having passed through the cylindrical part 134, and having been deposited on the EUV light reflecting mirror 121, reacts with hydrogen gas and is made into stannane gas. However, since hydrogen gas is sprayed without a pause to the EUV light reflecting mirror 121 from the gas outflow port 142 of the gas supply unit 140, the generated stannane gas can be immediately blown off by the flow of hydrogen gas. Accordingly, retention of stannane gas can be suppressed. Sn debris that reaches the EUV light reflecting mirror 121 is made into stannane gas sequentially, and is dispersed along with hydrogen gas. Accordingly, it is possible to suppress pollution due to Sn debris on the EUV light reflecting mirror 121.

5. Second Embodiment

5.1 Configuration

Figure 4:
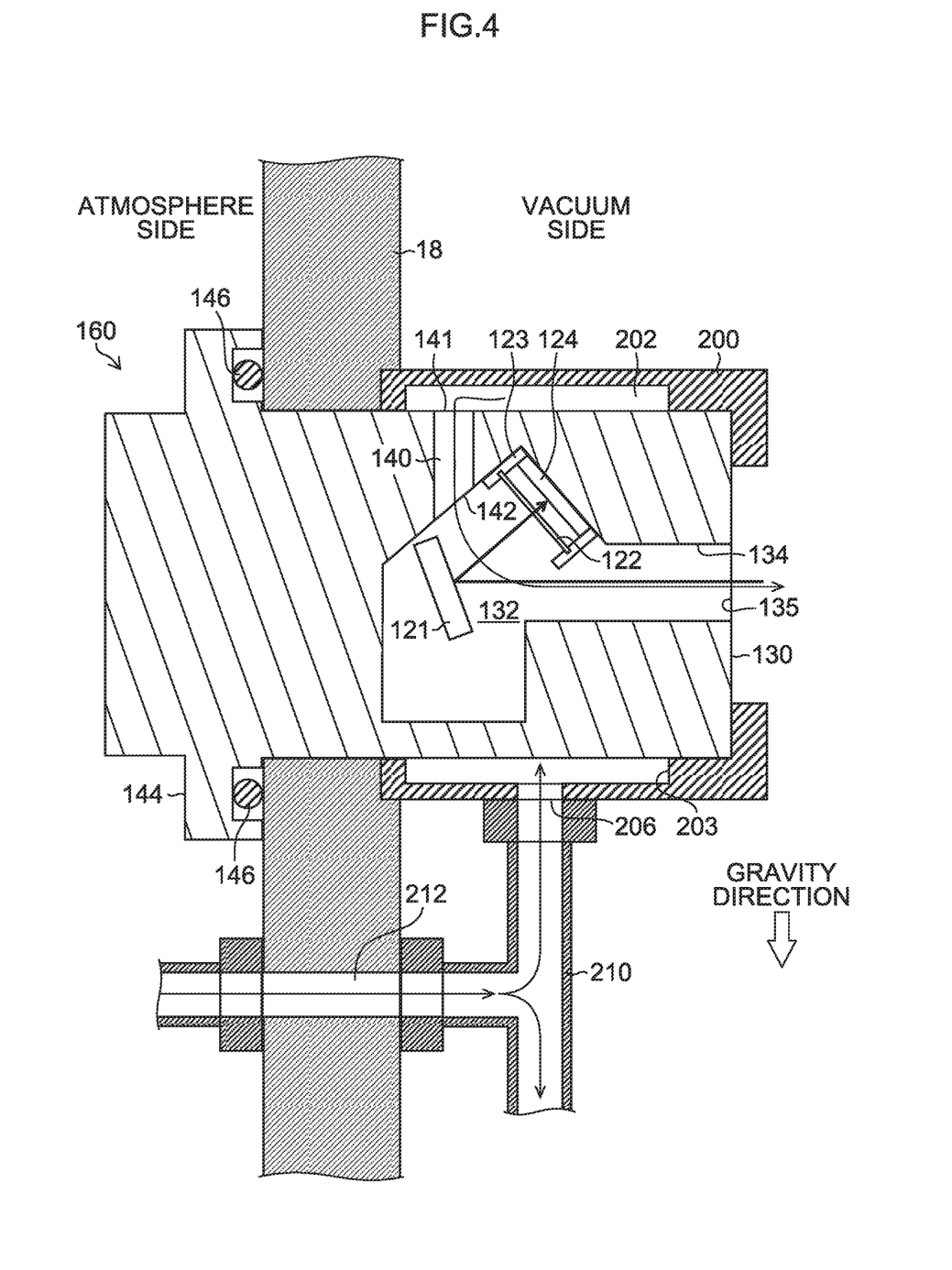
FIG. 4 is a cross-sectional view illustrating a configuration of an EUV light sensor unit according to a second embodiment.

FIG. 4 is a cross-sectional view illustrating a configuration of an EUV light sensor unit according to a second embodiment. Regarding the second embodiment illustrated in FIG. 4, a difference from the configuration described in FIG. 3 will be described.

An EUV light sensor unit 160 according to the second embodiment illustrated in FIG. 4 includes a socket 200 fitted to the outside of the casing 130. The socket 200 is disposed inside the chamber 18 in which EUV light is generated, that is, on the vacuum side. The socket 200 is formed to cover the vacuum side of the casing 130 of the EUV light sensor unit 160.

The casing 130 of the EUV light sensor unit 160 is inserted into the socket 200 from the atmosphere side of the chamber 18, whereby the casing 130 can be fitted to the socket 200 in the chamber 18. Further, in the fitted state illustrated in FIG. 4, the casing 130 can be pulled out to the atmosphere side to thereby be detached from the socket 200.

The socket 200 is configured such that a space 202 is formed between an outer wall of the casing 130 and an inner wall of the socket 200 when the casing 130 of the EUV light sensor unit 160 is joined. The space 202 may be formed throughout the whole periphery of the inner wall of the socket 200. When the casing 130 of the EUV light sensor unit 160 is inserted from the atmosphere side of the chamber 18, the space 202 between the inner wall of the socket 200 and the outer wall of the casing 130 is formed. The space 202 functions as a gas channel. At that time, the inner wall of the socket 200 and the outer wall of the casing 130 may not be sealed completely, and may not have a sealing structure particularly. A recessed portion 203 of the inner wall of the socket 200 that may form the space 202 corresponds to a form of a "gas channel forming part".

The socket 200 is provided with a pipe connecting section 206. The pipe connecting section 206 is connected with a pipe 210 for supplying gas. The pipe 210 is arranged around the inner wall of the chamber 18. The inside of the pipe 210 that is connected with the pipe connecting section 206 and the space 202 communicate with each other. The pipe 210 arranged around the inner wall of the chamber 18 may supply gas to a plurality of EUV light sensor units.

The pipe 210 is connected with the gas supply device 61 via a feedthrough 212. The feedthrough 212 for sending gas from the atmosphere side of the chamber 18 to the pipe 210 on the vacuum side may be put in one place.

A part, facing the space 202, of the outer wall of the casing 130 of the EUV light sensor unit 160 has a gas introduction port 141. The gas supply unit 140 from the gas introduction port 141 to the gas outflow port 142 is formed such that the gas introduced into the casing 130 is sprayed to the EUV light reflecting mirror 121.

5.2 Operation

The casing 130 of the EUV light sensor unit 160 accommodates the EUV light reflecting mirror 121, the filter 122, and the second optical sensor 124. By inserting the casing 130 into the socket 200 from the atmosphere side of the chamber 18, the casing 130 is joined to the socket 200.

The gas supplied from the pipe connecting section 206 of the socket 200 enters the casing 130 from the gas introduction port 141 via the gas channel that is the space 202 formed between the inner wall of the socket 200 and the outer wall of the casing 130, and is sprayed to the EUV light reflecting mirror 121.

5.3 Effect

According to the second embodiment, an effect similar to that of the first embodiment can be achieved. Further, according to the second embodiment, the purge gas supply channel is provided to the vacuum side that is the inside of the chamber 18. Accordingly, even if purge gas is leaked, it can be discharged by the discharge device 62 of the chamber 18.

According to the second embodiment, it is not necessary to provide an airtight mechanism to the gas supply channel disposed inside the chamber 18. Accordingly, there is no wear of a sealing member, so that high durability is realized at low cost.

According to the second embodiment, it is not necessary to detach a gas pipe in the maintenance work of the EUV light sensor unit 60. Accordingly, leakage check accompanying detachment of a gas pipe is not required. Therefore, the maintenance time can be reduced, and a possibility of hydrogen gas leakage can be reduced significantly.

The description provided above is intended to provide just examples without any limitations. Accordingly, it will be obvious to those skilled in the art that changes can be made to the embodiments of the present disclosure without departing from the scope of the accompanying claims.

The terms used in the present description and in the entire scope of the accompanying claims should be construed as terms "without limitations". For example, the term "including" or "included" should be construed as "not limited to that described to be included". The term "have" should be construed as "not limited to that described to be held". Moreover, an indefinite article "a/an" described in the present description and in the accompanying claims should be construed to mean "at least one" or "one or more".

What is claimed is:

1. An extreme ultraviolet light sensor unit comprising:
   a mirror configured to reflect extreme ultraviolet light;
   a filter configured to transmit the extreme ultraviolet light reflected by the mirror;
   an optical sensor configured to detect the extreme ultraviolet light having passed through the filter;
   a purge gas supply unit disposed to supply purge gas to a space between the mirror and the filter; and
   a pipe part configured to allow plasma light and the purge gas to pass therethrough, the plasma light including the extreme ultraviolet light to be made incident on the mirror, the purge gas supplied from the purge gas supply unit, the pipe part having an opening serving as a light entry port of the plasma light, the pipe part allowing the plasma light entering from the opening to pass therethrough toward the mirror and allowing the purge gas flowing to the space between the mirror and the filter to flow out of the opening,
   wherein the gas outflow port of the purge gas supply unit is provided at a position not facing the filter.

2. The extreme ultraviolet light sensor unit according to claim 1, wherein
   the purge gas supply unit has a gas outflow port from which the purge gas is ejected toward the space between the mirror and the filter.

3. The extreme ultraviolet light sensor unit according to claim 2, wherein
   the purge gas supply unit ejects hydrogen gas as the purge gas from the gas outflow port during generation of the extreme ultraviolet light.

4. The extreme ultraviolet light sensor unit according to claim 1, wherein the gas outflow port of the purge gas supply unit is open to the mirror.

5. The extreme ultraviolet light sensor unit according to claim 1, wherein
   the purge gas supply unit is disposed to allow the purge gas to flow to the space between the mirror and the filter, from a second optical path among a first optical path and the second optical path, the first optical path being an optical path for the plasma light to be made incident on the mirror from the opening while passing through the pipe part, and the second optical path being an optical path on which the extreme ultraviolet light reflected by the mirror travels toward the filter.

6. The extreme ultraviolet light sensor unit according to claim 1, further comprising
   a casing that accommodates the mirror, the filter, and the optical sensor, wherein
   the casing includes the pipe part and the purge gas supply unit.

7. The extreme ultraviolet light sensor unit according to claim 6, wherein
   the casing is mounted on a chamber while penetrating a wall of the chamber in which the extreme ultraviolet light is generated, and the opening of the pipe part is positioned inside the chamber.

8. The extreme ultraviolet light sensor unit according to claim 7, wherein
   the casing includes a flange portion, and
   the flange portion is positioned outside the chamber, and is fixed to the wall of the chamber via a gasket.

9. The extreme ultraviolet light sensor unit according to claim 6, further comprising
   a socket fitted to an outside of the casing, wherein:
   the socket includes:
     a gas channel forming part that forms a space serving as a gas channel between an outer wall of the casing and an inner wall of the socket; and
     a pipe connecting section that communicates with the gas channel forming part, and
   the purge gas is supplied into the casing through the space formed between the outer wall of the casing and the inner wall of the socket.

10. The extreme ultraviolet light sensor unit according to claim 9, wherein
    the socket is disposed in the chamber in which the extreme ultraviolet light is generated, and the socket is fitted to the casing in the chamber.

11. An extreme ultraviolet light generation device comprising:
    the extreme ultraviolet light sensor unit according to claim 9;
    a chamber into which laser light is introduced; and
    a target feeding unit configured to feed a target into the chamber,
    the target, fed from the target feeding unit into the chamber, being irradiated with the laser light and being made into plasma to generate extreme ultraviolet light,
    the socket and a pipe that is connected with the pipe connecting section being disposed inside the chamber,
    the extreme ultraviolet light generation device further comprising a feedthrough configured to introduce the purge gas from an outside of the chamber to the pipe inside the chamber through a wall of the chamber.

12. The extreme ultraviolet light sensor unit according to claim 11, wherein
    the pipe is arranged around an inner wall of the chamber.

13. The extreme ultraviolet light sensor unit according to claim 11, wherein the pipe is connected with the gas supply device via a feedthrough.

14. An extreme ultraviolet light generation device comprising:
- the extreme ultraviolet light sensor unit according to claim 1;
- a chamber into which laser light is introduced; and
- a target feeding unit configured to feed a target into the chamber,
- the target, fed from the target feeding unit into the chamber, being irradiated with the laser light and being made into plasma, to generate the extreme ultraviolet light.

15. The extreme ultraviolet light generation device according to claim 14, wherein
- in a state where the extreme ultraviolet light sensor unit is mounted on a wall of the chamber, the mirror is disposed below, in a gravity direction, the gas outflow port of the purge gas supply unit.

16. The extreme ultraviolet light generation device according to claim 14, further comprising:
- a pipe that communicates with the purge gas supply unit; and
- a gas supply device connected with the pipe and configured to supply the purge gas to the pipe.

17. The extreme ultraviolet light generation device according to claim 14, wherein
- the target is tin, and
- the purge gas includes hydrogen.

18. The extreme ultraviolet light sensor unit according to claim 1, wherein
- the mirror is a mirror including an Mo/Si multilayer film in which molybdenum (Mo) and silicon (Si) are alternately layered.

19. The extreme ultraviolet light sensor unit according to claim 1, wherein
- the filter is a metallic filter or a metallic filter made of zirconium (Zr) having a film thickness of 300 nm to 600 nm.

20. The extreme ultraviolet light sensor unit according to claim 1, wherein
- a plurality of optical sensors are disposed, and
- a position of plasma is calculated from a position and energy detected by each of the optical sensors.

* * * * *